Patented Apr. 26, 1938

2,115,557

UNITED STATES PATENT OFFICE 2,115,557

MODIFIED OIL-SOLUBLE PHENOLIC RESIN

Paul E. Marling, Dayton, Ohio, assignor, by mesne assignments, to Monsanto Chemical Company, a corporation of Delaware No Drawing. Application July 31, 1935, Serial No. 34,059

2 Claims. (Cl. 260—4)

This invention relates to the manufacture of modified phenol aldehyde resins and coating materials produced from such prepared resins.

One of the principal objects of this invention is to provide a prepared resin by reacting or combining an oil-soluble phenolic synthetic resin with non-drying vegetable oils and especially the hydroxy oils such as castor oil and other materials to produce a resultant resinous reaction product having superior characteristics; more specifically the invention provides a protective coating material made from such a reaction product more fully described herein, which coating material produces a non-tacky, extremely flexible and substantially waterproof film.

It has been shown heretofore that oil-soluble phenolic synthetic resins combine with drying oils to yield reaction products that are suitable as coating compositions. It might be assumed that all resins soluble in an oil would combine in this manner with such oils, but investigations demonstrated that this was not the case. Thus resins of the heat-reactive phenol-aldehyde, rosin ester, rosin-phenol-aldehyde and alkyd types, and rosin itself, failed by behave in a like manner, the products being soft and tacky, and failed to combine with the oils.

The oil-soluble phenolic resins which have been found to combine with drying and semi-drying oils according to the process of this invention are embraced in the group formed by the reaction of substituted phenols and aldehydes. Such phenols include beta-naphthol, para-tertiary-amylphenol, para-tertiary-butylphenol, phenyl phenol, xylenols and similar substituted phenols. The manufacture of phenol aldehyde resins of this type is well known to the resin art and the products are often designated as 100% phenolic oil-soluble resins.

I have found that when oil-soluble phenolic resins are heated with a hydroxy non-drying oil, such as castor oil, a new resinous reaction product is formed. This is evidenced by the foaming and the liberation of water during the reaction. The resulting product also has a lower iodine value than the original resin. This reaction product upon cooling forms a tough resin soluble in varnish solvents, such as mineral spirits. If a solution thereof containing a metallic siccative (drier) is brushed on a surface, it dries in air to form a usuable film that is tough, waterproof and flexible, as well as very adherent to the surface; a solution containing no drier gives a film which upon baking at 250° F. for an hour results in a finish that is tough, waterproof and considerably more flexible than the air dried film.

The formation of such a reaction product is novel, and one not to be expected, since resins do not, in general, react with castor oil, and do not yield a product with castor oil which dries to form a usable film. The film produced from the reaction product of an oil-soluble phenolic resin with castor oil is waterproof and is more flexible than the film produced from varnishes containing the same resin with drying oils. It is also more flexible than the film produced from varnishes made in the ordinary way from a resin with a mixture of drying and non-drying oils.

It has been further discovered that the oil-soluble phenolic resin may also be reacted with a combination of a vegetable oil such as castor oil and a polyhydric alcohol such as glycerol to produce a still different resinous reaction product which is superior, especially in flexibility of the film produced therefrom.

When castor oil is heated along above the usual "blowing" temperature, a saponification reaction takes place, which results in the liberation and volatilization of some of the castor oil acids. Such saponification may set in during the process of heating the resin with the oil. During such heat treatment the oil loses 6 to 10% of its weight by volatilization and gels to a rubber like mass. If a polyhydric alcohol such as glycerol be added to the oil so thermally treated, the reacted mixture loses its viscous consistency and again becomes relatively fluid. At the same time the acid number is reduced probably by esterification of free acid and added glycerol. According to my invention and at this stage, resin is added and a temperature of preferably 260–285° C. is maintained until a clear "pill" is obtained.

Instead of using a straight 100% oil soluble phenol aldehyde resin one may obtain excellent results and at the same time reduce the cost very substantially by substituting for a part of the phenolic resin a synthetic hydrocarbon resin such as is obtained according to the process described in U. S. Patent to Charles A. Thomas and Carroll A. Hochwalt, No. 1,836,629 of December 15, 1931.

The reaction product of castor oil and resin may be further heated with an additional proportion of a polyhydric alcohol, such as glycerol. A reaction product may also be produced by heating together a mixture of polyhydric alcohol, castor oil and the described oil-soluble synthetic resin, but a reaction product so formed has somewhat different properties. Various polyhydric alcohols such as glycerol, di-ethylene glycol and ethylene glycol are suitable for carrying out this reaction.

On replacing a portion of the non-drying oil in such compositions with a drying oil such as tung oil (China-wood oil) a similar superior product is obtained, which is tough, flexible, and substantially waterproof. Such products dissolve readily in the usual varnish solvents and such solutions when brushed on a surface, deposit, on drying, films which are adherent and possess the properties of toughness and flexibility, already mentioned, as inherent in the resin. As before, polyhydric alcohols can be used to control undesirable saponification of the oils.

As an example of the production of these new reaction products, the following procedures are typical.

The reaction is preferably conducted in a kettle made from or lined with material not affected by the reaction. Glass or stainless steel vessels have been found satisfactory, whereas the use of iron vessels appears to produce a darker colored product. The vessel is provided with a stirrer and with a suitable condenser so that water and other volatile products which are formed during the heating can be condensed conveniently and collected.

A suitable quantity (100 parts by weight, and this should be less than half the capacity of the kettle) of blown castor oil is then heated in the kettle selected to about 310° to 315° C., or until the mass begins to gel or polymerize, that is, until the mass has the consistency of jelly. The heating is stopped at this point and the mass is allowed to cool rapidly to about 260° C. to prevent further gelling. About 6 parts by weight of glycerol are then added and the mixture is heated to about 285° C. or until it begins to thin somewhat. During the heating the stirrer is kept in operation. When the mixture has reached a thin or oily consistency, the exact point being judged by previous experiment and experience, 100 parts by weight of the oil-soluble phenol-aldehyde resin are then added. After this addition the temperature will be somewhat below 285° C., generally between 260° and 285° C., at which temperature the mass is maintained and stirred until it appears clear, that is, until a sample dropped on a metal plate, according to the usual practice of varnish makers, gives a clear "pill" or drop of material. The stirring may require about 1 hour and additional heat will be required to maintain a temperature above about 260° C. The mixture is then cooled to about 260° C. and about 3 parts by weight of glycerol are added. The mixture is again heated to about 310° C. and held at that temperature until bodying starts, that is, until the mixture begins to thicken. The degree to which the bodying is carried is dependent upon the use to which the product is to be put and this is determined by experiment. When the desired body has been attained the mixture is cooled to about 230–260° C. and at this temperature the desired amount of mineral spirits or other varnish thinner is added in order to produce a material which when cooled will be of the desired consistency for use as a coating material.

During the whole process above described, the volatile constituents are being distilled off and may be collected and weighed if desired, so that the total weight of the remaining product may be calculated and considered in relation to the amount of thinner to be added. The thinner is preferably added as described at the temperature indicated, because the reaction product dissolves more slowly when cold.

The above method has been found applicable, with slight modifications depending upon the characteristics of the products desired, to a resin prepared from para-tertiary-butyl-phenol and formaldehyde, to commercial 100% phenolic oil-soluble resins such as those known as bakelite BR—254 and BR—820 and to a resin prepared from formaldehyde and the phenol resulting from the condensation of phenol with a cracked kerosene distillate.

In addition, similar products may be prepared from unsaturated hydrocarbon resins resulting from the treatment of cracked hydrocarbon distillates with catalysts of the Friedel-Crafts type, according to the procedures described in various patents of which U. S. Patent 1,836,629 of December 15, 1931, granted to Charles A. Thomas and Carroll A. Hochwalt is particularly pertinent hereto. Such resins comprise reaction products of olefin, diolefin, aromatic, alkylated aromatic, and terpene hydrocarbons, all of which occur to a greater or lesser extent in cracked petroleum distillates. In general, such resins are prepared by agitating a cracked petroleum distillate for a short period of time with a metallic halide such as anhydrous aluminum chloride, removing the aluminum chloride by precipitation with an alcoholic solution of ammonia and recovering the resin from the resulting clear filtrate by evaporation. The resin thus formed may be treated in numerous ways, for example, by distillation with steam, treatment with decolorizing agents or filtration through bleaching clays to remove undesirable impurities. Inasmuch as these hydrocarbon resins are much less expensive than the commercial oil-soluble phenolic resins and since they react with castor oil and drying oils in an analagous manner, it is advantageous in preparing these compositions with castor and similar oils to replace some of the phenolic resin by hydrocarbon resin. Entirely satisfactory tough flexible films have been prepared from a composition prepared by the aforedescribed method in which one-half of the phenolic resin (corresponding to 50 parts) was replaced by a hydrocarbon resin.

In replacing some of the castor oil or other non-drying oils with drying oils such as tung oil, linseed oil, perilla oil, sardine oil, soya bean oil, all of which have been comprehensively investigated in these compositions, the procedure for making these resinous products is substantially the same as already described above.

The resulting resinous products, when allowed to harden without dilution with a solvent, have the general appearance of synthetic rubbers. They are characterized by toughness, flexibility and are not hard and tacky at ordinary temperatures. The products are soluble in chloroform, benzene, toluene, turpentine and petroleum solvents such as mineral spirits, naphtha and coal-tar solvents such as solvent naphtha. The solution in solvent naphtha or mineral spirits is clear and when brushed on a surface leaves a clear yellowish film which air dries with metallic siccatives; a solution containing no drier gives a film which upon baking at 250° F. for an hour results in a finish that is tough, waterproof and considerably more flexible than the air dried film.

Films made from these materials, particularly those made with a large proportion of castor oil or that made with equal parts of tung oil and castor oil, retained their flexibility to a most unusual degree when subjected to accelerated aging tests by baking at 120° C. for various periods of time. After such films on metal sheets had been exposed to baking for as long as 200 hours at 120° C., the metal sheet could be bent double several times in succession without cracking or injuring the film. The films are substantially waterproof, very resistant to acids and alkalies and their durability is quite satisfactory. As the film is not softened by lacquer it is particularly suitable as an under or prime coat for other coating materials. The products are also adapted for use with pigments in the usual manner to make coating materials. Because of their great flexibility and durability these materials are of special value for use on surfaces subject to shock or strain. With or without pigments, filling materials and the like, the resinous materials are also adapted for use as molding compounds.

In that the methods and processes herein described have been selected only by way of illustration, being typical and preferred embodiments of the invention, it is to be understood that the invention is not limited to these precise methods or processes, or precise products, and that changes may be made therein without departing substantially from the invention, which is defined in the appended claims.

What I claim is:

1. The method of forming a tough, rubber-like material which comprises heating castor oil until it gels, reacting the gelled castor oil with a polyhydric alcohol and thereafter reacting the castor oil-polyhydric alcohol reaction product with an unmodified oil-soluble resinous condensation product of a phenol and an aldehyde, the final reaction product being soluble in mineral spirits and when applied to a surface in film form resulting in a film which is tough, water resistant and flexible.

2. A composition of matter comprising the reaction product of an unmodified oil-soluble resinous condensation product of a phenol and an aldehyde, a polyhydric alcohol and castor oil, said reaction product being obtainable by heating castor oil until it gels, reacting the gelled castor oil with a polyhydric alcohol and thereafter reacting the castor oil-polyhydric alcohol reaction product with an unmodified oil-soluble resinous condensation product of a phenol and an aldehyde, the final reaction product being soluble in mineral spirits and when applied to a surface in film form resulting in a film which is tough, water resistant and flexible.

PAUL E. MARLING.